US006483603B1

(12) United States Patent
Yonenaga

(10) Patent No.: US 6,483,603 B1
(45) Date of Patent: Nov. 19, 2002

(54) IMAGE FORMING APPARATUS

(75) Inventor: Kohtaroh Yonenaga, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/477,622

(22) Filed: Jan. 4, 2000

(30) Foreign Application Priority Data

Jan. 14, 1999 (JP) .......................................... 11-008020
Mar. 3, 1999 (JP) .......................................... 11-055370
Sep. 17, 1999 (JP) .......................................... 11-262851

(51) Int. Cl.⁷ ............................................... G06F 13/00
(52) U.S. Cl. ...................... 358/1.16; 358/1.12; 347/153
(58) Field of Search .......................... 358/1.2, 1.3, 1.4, 358/1.8, 1.12, 1.13, 1.16; 347/16, 114, 129, 153, 154, 158

(56) References Cited

U.S. PATENT DOCUMENTS 5,978,561 A * 11/1999 Kimura et al. ............. 358/1.16

* cited by examiner

*Primary Examiner*—Mark Wallerson
(74) *Attorney, Agent, or Firm*—Oblon, Spivak, McClelland, Maier & Neustadt, P.C.

(57) ABSTRACT

An image forming apparatus of the present invention continuously conveys a first and a second document set on an ADF (Automatic Document Feeder) and having a reference image size to a document reading unit. When the document reading unit reads the first and second documents, image data read out of the second document are written to a delay memory. After the first document has been read, the image data of the second document are read out of the delay memory on the elapse of a period of time corresponding to a difference between an interval between consecutive papers and an interval between the above documents fed by the ADF. The apparatus can therefore efficiently form the images of two documents at the same time without resorting to a large capacity memory. Alternatively, when the document reading unit starts reading the first document after the second document, the image data of the first document may be delayed by the difference between the two intervals. This allows the two documents to be stored at the interval between the consecutive papers and thereby insures high quality images free from defective registration.

10 Claims, 9 Drawing Sheets

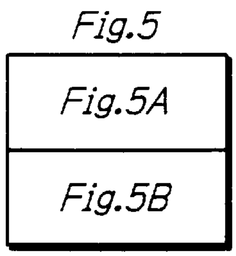
Fig. 5A
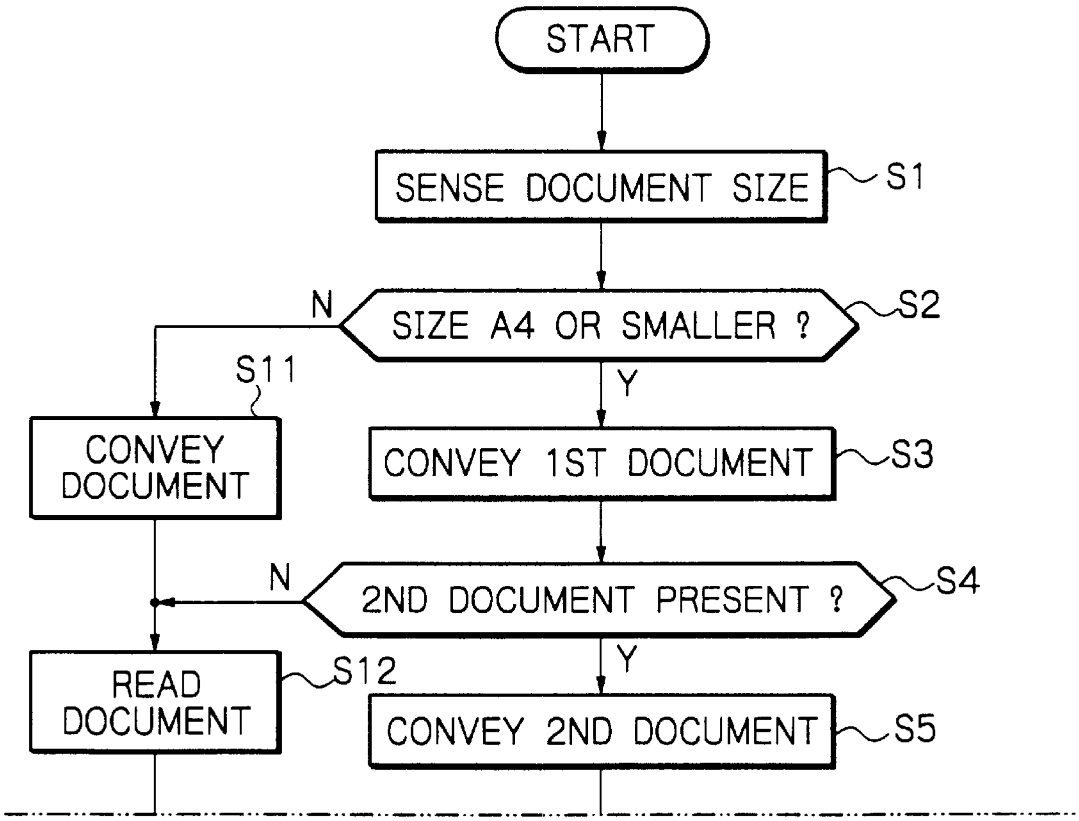

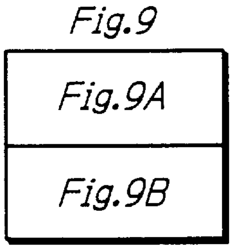
Fig. 9A
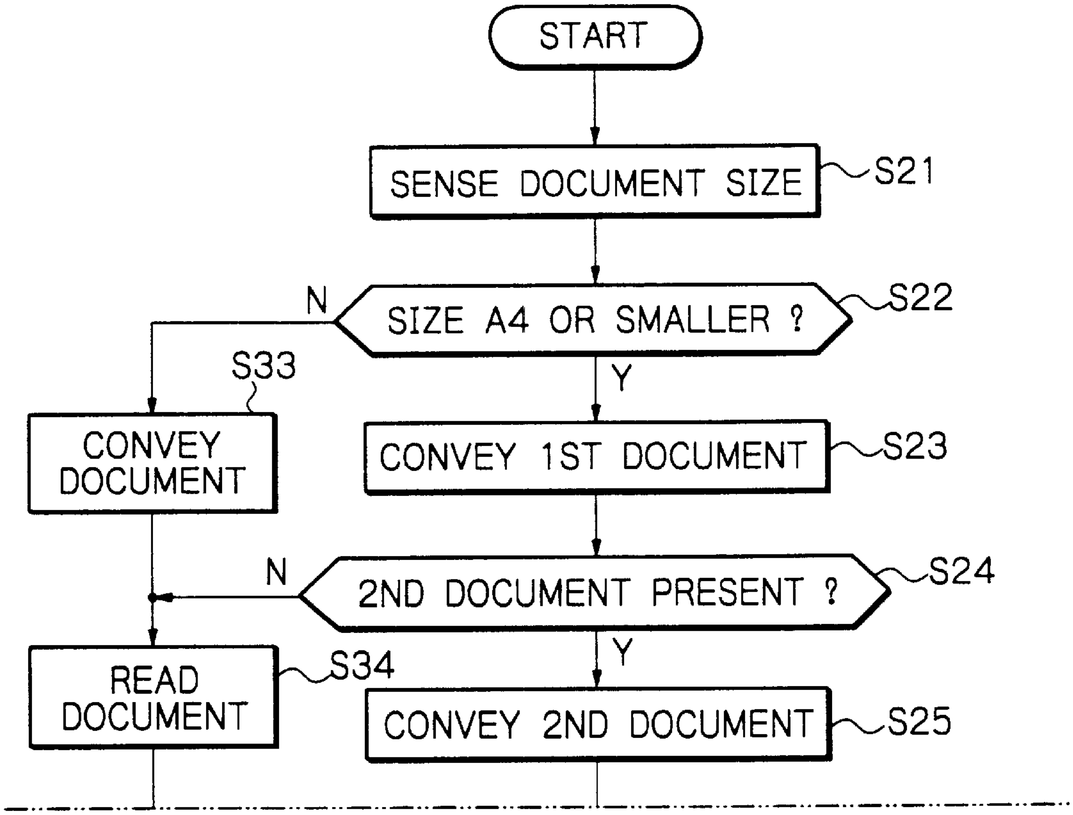

IMAGE FORMING APPARATUS

BACKGROUND OF THE INVENTION

The present invention relates to a digital color copier, printer or similar image forming apparatus of the type capable of forming a plurality of different images at the same time and more particularly to an image forming apparatus capable of reducing capacity required of a memory and enhancing the productivity of images.

An image forming apparatus of the type described uses an ADF (Automatic Document Feeder) for continuously feeding two of a plurality of documents to a glass platen included in a document feeding unit. Specifically, the ADF conveys two documents to the document reading unit at an interval corresponding to an interval between papers fed one by one, so that the leading edge of the image of the second document meets and that of the second paper meet each other.

In practice, however, a preselected density pattern is formed, during the interval between papers, on a photoconductive element carrying a toner image thereon for the purpose of controlling, e.g., the toner content of a developer. Specifically, a density sensor senses the density of the preselected pattern to see if a toner image is formed with adequate density or not. Generally, therefore, the interval between documents fed by the ADF is greater than the interval between papers, increasing the range that the document reading unit has to read. As a result, the image reading unit and therefore the entire image forming apparatus is bulky.

In light of the above, image data read by the document reading unit out of two consecutive documents may be written to a page memory and then read out at a timing so adjusted as to cause the leading edge of each image to meet the leading edge of a particular paper. This kind of scheme, however, needs an expensive memory having a capacity great enough to accommodate the image data of two documents.

To solve the above problem, as soon as the document reading unit reads the entire first document, it may stop its reading operation and resume it at the time when the second document is fed from the ADF. This is also successful to cause the leading edge of the second document and that of the second paper to meet each other. However, causing the document reading unit to stop its operation and then resume it is time-consuming and cancels the advantage of the simultaneous formation of two document images, i.e., high-speed image formation.

SUMMARY OF THE INVENTION

It is therefore an object of the present invention to provide an image forming apparatus having a miniature configuration and capable of enhancing the productivity of image formation without resorting to a large capacity memory.

In accordance with the present invention, an image forming apparatus includes a photoconductive element for forming a toner image thereon. An intermediate image transfer body is provided with a plurality of reference marks defining reference positions for the transfer of the toner image. The intermediate transfer body is capable of simultaneously holding two different toner images of a reference image size transferred from the photoconductive element. The two toner images are transferred from the intermediate image transfer body to two consecutive papers fed one by one. A document reading unit sequentially reads two documents of the reference image size sequentially fed from an ADF. When the document reading unit reads the two documents, a controller stores image data representative of a second document in a delay memory. After a first document has been read, the controller outputs the data of the second document by delaying the image data by a period of time corresponding to a difference between an interval between the papers and an interval between the documents.

Also, in accordance with the present invention, an image forming apparatus includes a photoconductive element for forming a toner image thereon. An intermediate image transfer body is provided with a plurality of reference marks defining reference positions for the transfer of the toner image. The intermediate image transfer body is capable of simultaneously holding two different toner images of a reference image size transferred from the photoconductive element. The two different toner images are transferred from the intermediate image transfer body to two papers fed one by one. A document reading unit sequentially reads two documents of the reference image size sequentially fed from an ADF at a preselected interval. When the document reading unit having read first one of two documents starts reading the next document, a controller stores image data representative of the next document by delaying them by a period of time corresponding to a difference between an interval between papers fed one by one and an interval between the documents fed from the ADF.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
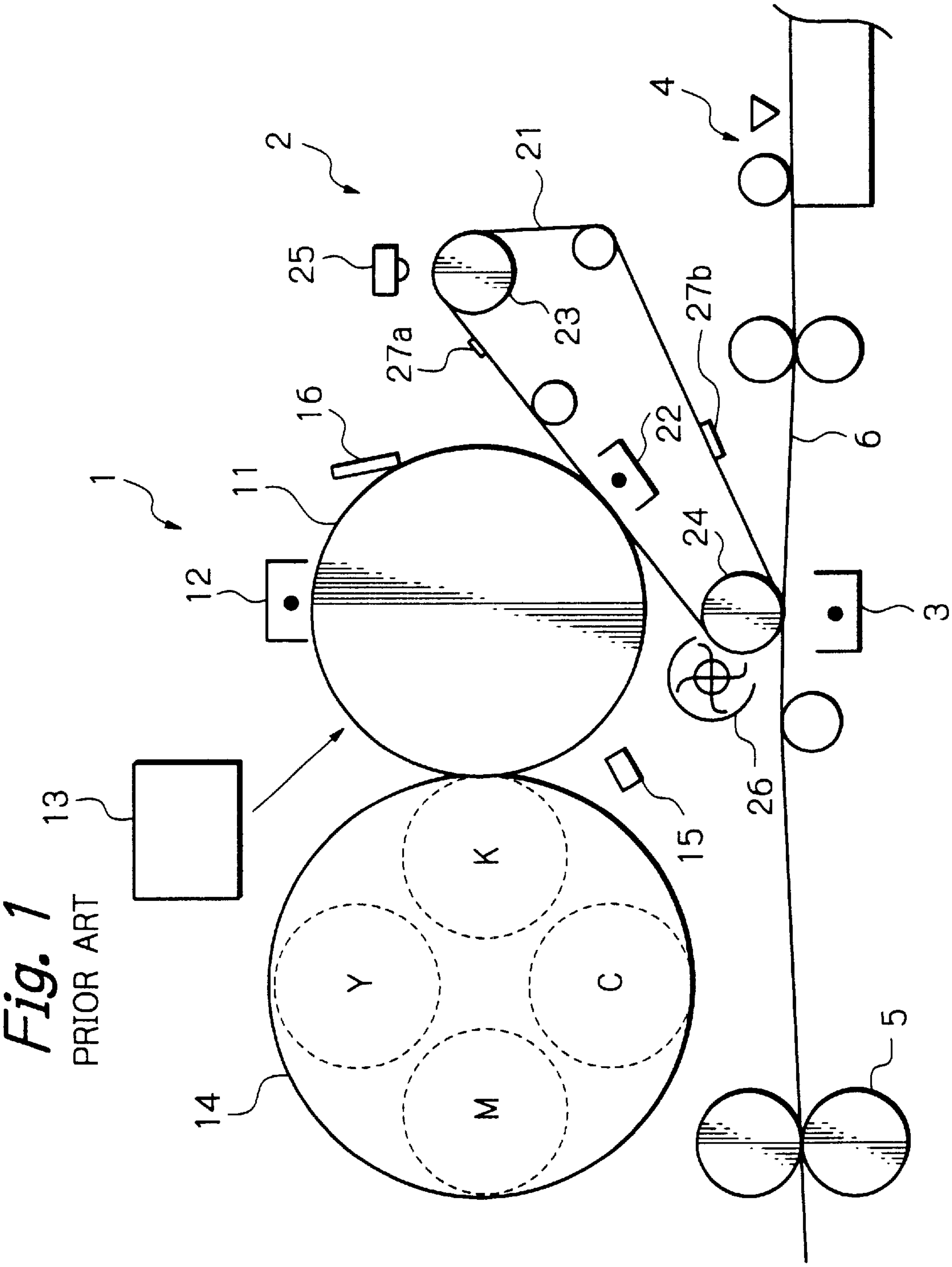
Fig. 1 PRIOR ART
FIG. 1 is a view showing a conventional image forming apparatus.

To better understand the present invention, reference will be made to a conventional image forming apparatus capable of forming an image representative of a document read by a document reading unit or received from a host, shown in FIG. 1. As shown, the apparatus includes an image forming unit 1, a primary image transfer unit 2, a secondary image transfer unit 3, a paper feed unit 4, and a fixing unit 5. The image forming unit 1 includes a charger 12, an image writing section 13, a rotary color developing unit (revolver hereinafter) 14, a density sensor 15 and a drum cleaner 16 arranged around a photoconductive element 11. The photoconductive element 11 is implemented as a drum. The revolver 14 has a black (K) developing section, a cyan (C) developing section, a magenta (M) developing section, and a yellow (Y) developing section. The image writing section 13 forms a latent image on the drum 11 with a laser beam. The revolver 14 develops the latent image with toner to thereby produce a corresponding toner image. The density sensor 15 senses the density of a particular pattern formed on the drum 11 by toner in order to determine whether or not the toner image has adequate density.

Figure 2:
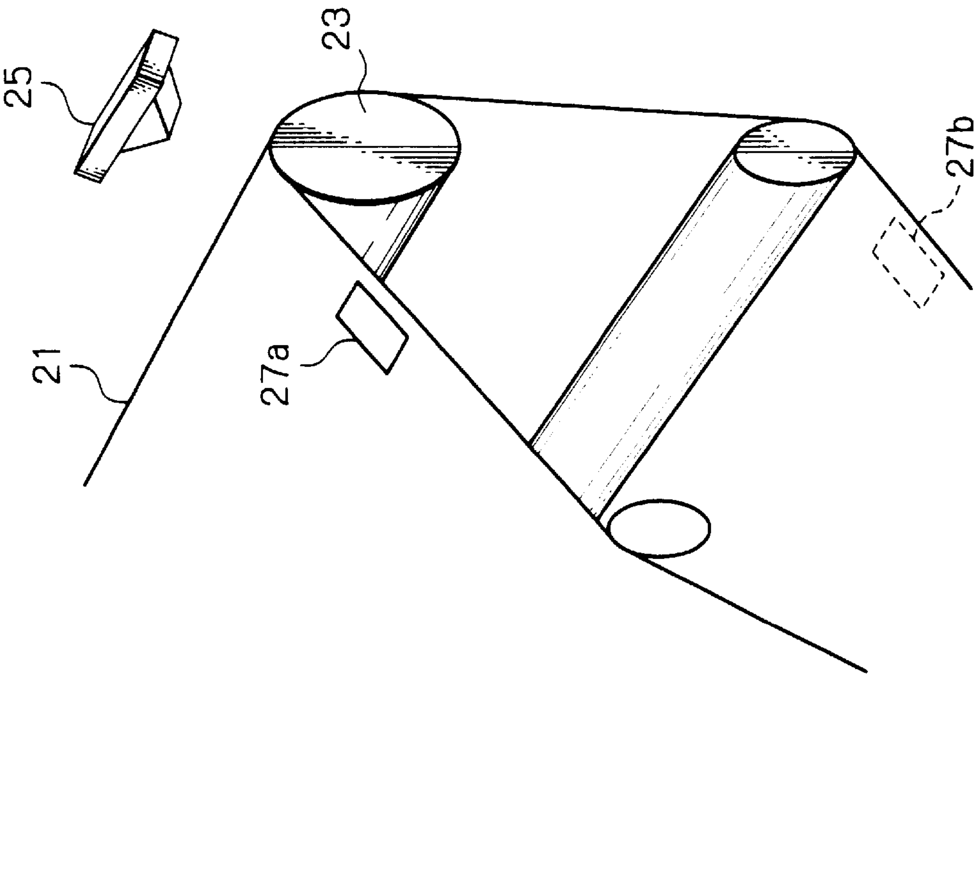
Fig. 2 PRIOR ART
FIG. 2 is a fragmentary isometric view showing reference marks provided on an intermediate image transfer belt included in the apparatus of FIG. 1.

The primary image transfer unit 2 includes an intermediate image transfer body implemented as a belt 21, a primary transfer section 22, a plurality of tension rollers 23, a secondary transfer roller 24, a reference position sensor 25, and a belt cleaner 26. The primary image transfer unit 2 transfers the toner image from the drum 11 to the belt 21 (primary image transfer). The belt 21 has a length at least two times greater than a reference image size, e.g., size A4 and is capable of transferring two different toner images at the same time. As shown in FIGS. 1 and 2, two reference marks 27*a* and 27*b* are positioned in the non-image portion of the belt 21 and spaced from each other by a preselected distance. A moving mechanism, not shown, maintains the belt 21 spaced from the surface of the drum 11 except when the primary image transfer is effected. The secondary image transfer unit 3 transfers the toner image from the belt 21 to a paper 6 (secondary image transfer).

Assume that an image read by the image forming unit or received from the host is a monocolor image. Then, when the apparatus starts an image forming cycle, a toner image is formed on the drum 11 by using the reference mark 27*a* or 27*b* sensed by the reference position sensor 25 first as a reference. The primary image transfer unit 2 transfers the toner image from the drum 11 to the belt 21. Subsequently, the second image transfer unit 3 transfers the toner image from the belt 21 to the paper 6. The paper 6 is fed from the paper feed unit 4 such that its leading edge meets the leading edge of the toner image existing on the belt 21. The fixing unit 5 fixes the toner image transferred to the paper 6 with heat and pressure. The belt cleaner 26 removes toner left on the belt 21 after the secondary image transfer.

When the image to be formed is a bicolor image, the reference position sensor 25 senses the reference mark 27*a* or 27*b* of the belt 21. A toner image is formed on the drum 11 on the basis of the resulting output of the reference position sensor 25. The toner image is transferred from the drum 11 to the belt 21 by primary image transfer. Primary image transfer is repeated with each of two colors. Specifically, the belt 21 is caused to turn two times in the case of a bicolor image or four times in the case of a full-color image. Every time the belt 21 turns, a toner image is transferred from the drum 11 to the belt 21 on the basis of the output of the reference position sensor 25. As a result, images of different colors are sequentially transferred to the belt 21 in accurate register with each other. After the primary transfer of a toner image of preselected color has been transferred to the belt 21, the resulting composite toner image is transferred from the belt 21 to the paper 6. The fixing unit 5 fixes the toner image formed on the paper 6 with heat and pressure, as stated earlier.

Figure 3:
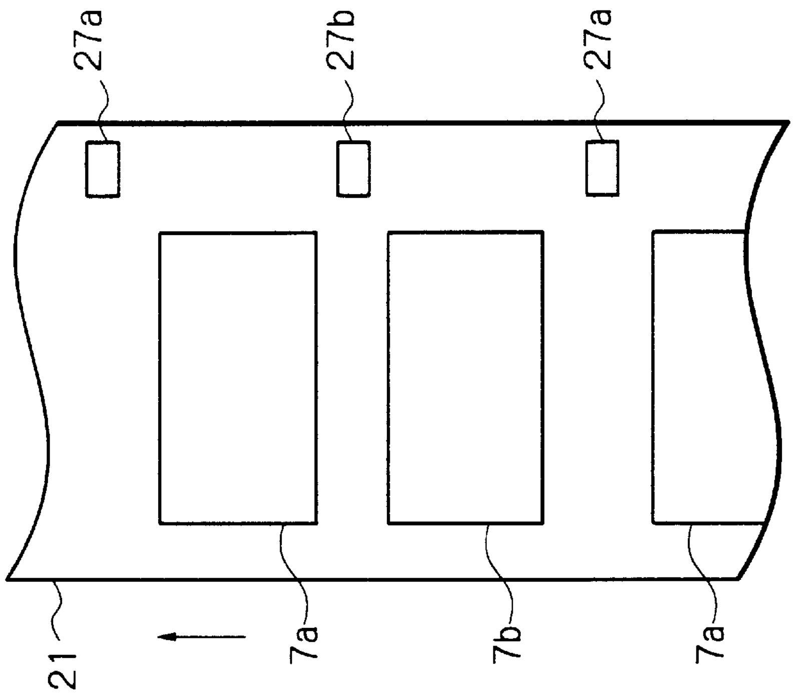
Fig. 3 PRIOR ART
FIG. 3 is a developed view showing toner images formed on the belt of FIG. 2; FIG.

Assume that two toner images of the reference size, e.g., size A4 should be transferred form the drum 11 to the belt 21 at the same time. Then, as shown in FIG. 3, one toner image 7*a* is transferred to the belt 21 on the basis of the output of the reference position sensor 25 representative of the reference mark 7*a*. Subsequently, another toner image 7*b* is transferred to the belt 21 on the basis of the output of the sensor 25 representative of the next reference mark 7*b*. To form a full-color toner image, the belt 21 is caused to turn four times. Every time the belt 21 turns, one of the toner images 7*a* and 7*b* are transferred to the belt 21 in accordance with the output of the sensor 25.

The above conventional image forming apparatus has some problems left unsolved, as discussed earlier.

Figure 4:
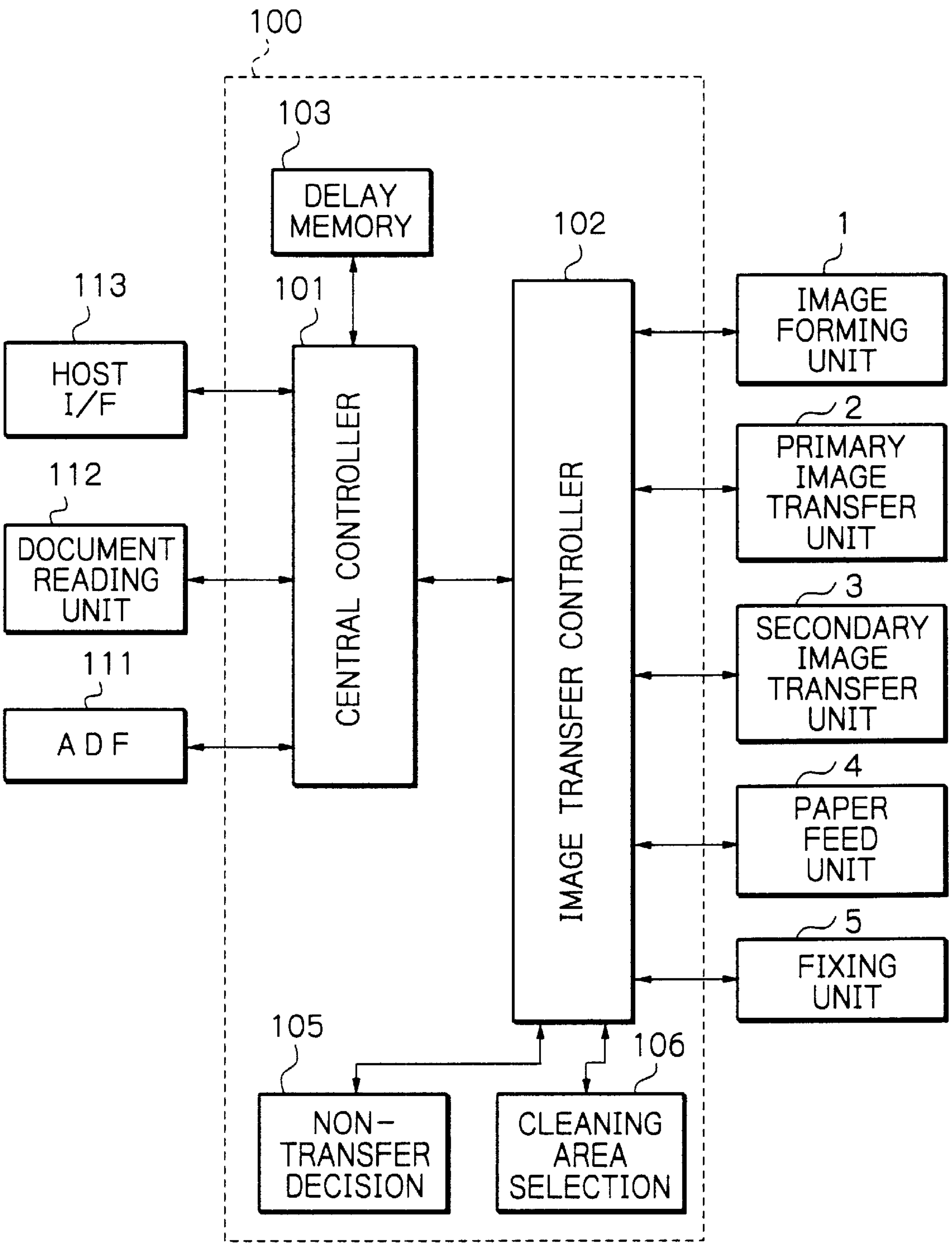
FIG. 4 is a block diagram schematically showing an image forming apparatus embodying the present invention.

Referring to FIG. 4, an image forming apparatus embodying the present invention is shown which is identical with the conventional apparatus as to the arrangements of the image forming unit 1, primary image transfer unit 2, secondary image transfer unit 3, paper feed unit 4, and fixing unit 5. A control unit 100 is generally made up of a central controller 101, an image transfer controller 102, a delay memory 103, a non-transfer decision 105, and a cleaning area selection 106.

The central controller 101 controls the operation of an ADF 111 so as to feed a document from the ADF 111 to a document reading unit 112. Further, the central controller 101 controls the operation of the document reading unit 112 so as to process image data read by the unit 112 or image data received from a host, not shown, via a host interface (I/F) 113. The image transfer controller 102 controls the operations of the image forming unit 1, primary image transfer unit 2, secondary image transfer unit 3, paper feed unit 4 and fixing unit 5 for forming an image on a paper 6. The delay memory 103 temporarily stores image data for shifting a document read by the document reading unit 112. When the paper feed unit 4 runs out of papers, the non-transfer decision 105 determines whether or not any one of toner images transferred to the belt 21 has not been transferred to the paper 6 on the basis of control information output from the image transfer controller 102. Also, if such a toner image is present on the belt 21, the non-transfer decision 105 determines the area of the belt 21 where the toner image is present. The cleaning area selection 106 determines, based on the output of the decision 105, the area of the belt 21 to be cleaned.

Figure 5B:
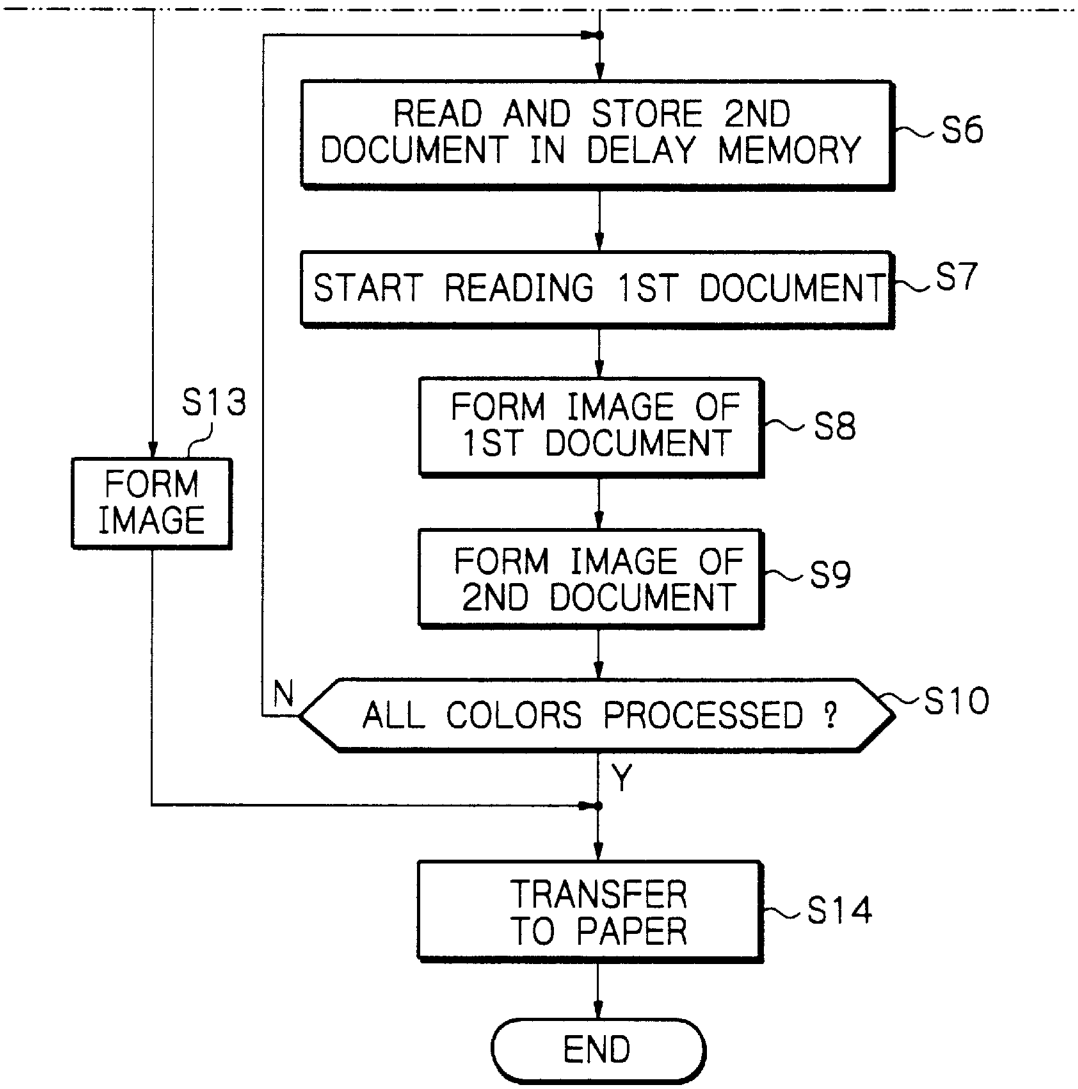
FIG. 5 is a flowchart demonstrating a specific operation of the illustrative embodiment.
Figure 6:
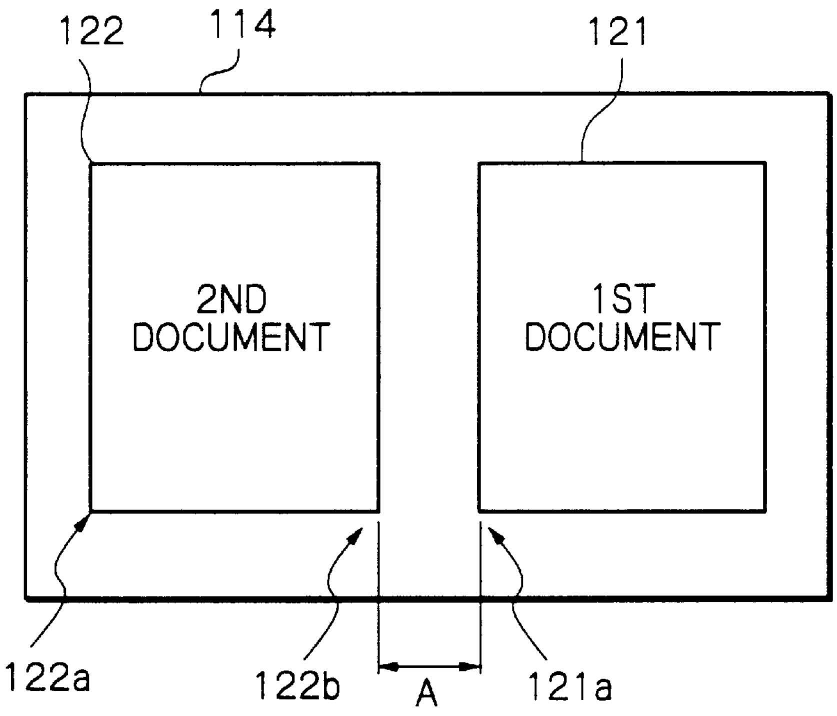
FIG. 6 is a plan view showing two documents positioned on a glass platen in the illustrative embodiment.

Reference will be made to FIG. 5 for describing a specific operation of the illustrative embodiment for copying documents set on the ADF 111 on papers 6. As shown, the central controller 101 determines the size of the documents on the basis of a signal output from a document size sensor, not shown, included in the ADF 111 (step S1). If the document size is A4 or smaller (Y, step S2), the central controller 101 drives the ADF 111 for causing it to convey the first document to a glass platen 114 (see FIG. 6) included in the document reading unit 112 (step S3). Subsequently, the central controller 101 determines whether or not the second document is present on the ADF 111 on the bas is of the output of the document size sensor (step S4). If the answer of the step S4 is positive (Y), the central controller 101 again drives the ADF 111 so as to convey the first document reached the glass platen 114 and the second document present on the ADF 111 (step S5). As a result, as shown in FIG. 6, the first and second documents, respectively labeled 121 and 122, are positioned on the glass platen 114 at a preselected interval A from each other. The central controller 101 then causes the image reading unit 112 to read the second document 122 from a scan start position 122*a* to a scan end position 122*b*. Image data read by the image reading unit 112 are written to the delay memory 103 (step S6).

Figure 7:
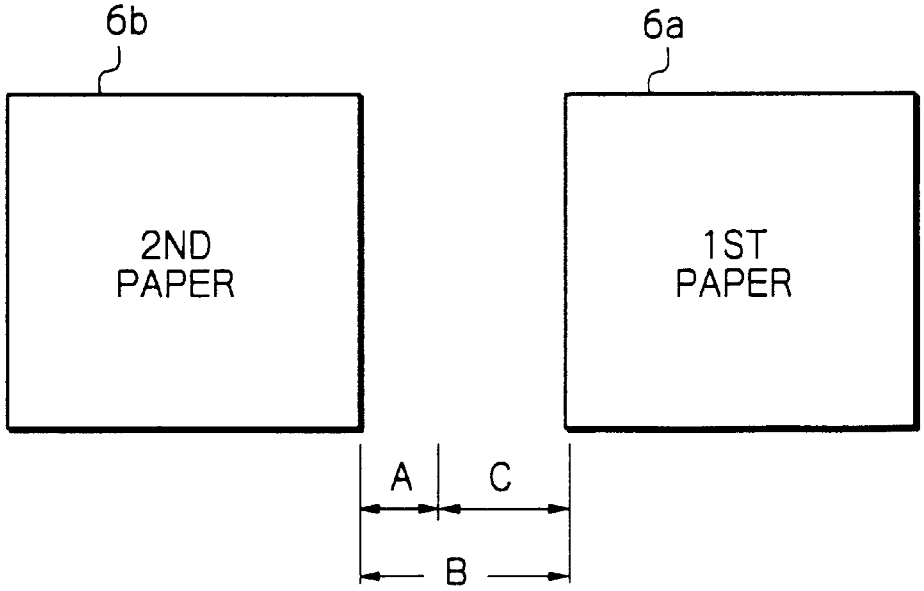
FIG. 7 is a view for describing an interval between papers and an interval between documents fed by an ADF.

The delay memory 103 delays the image data by a period of time T which is an interval between the time when image data are written and the time when they are read out. Specifically, as shown in FIG. 7, assume that the first and second sheets 6*a* and 6*b* are sequentially fed from the sheet feed unit 4 at an interval B, and that the documents are sequentially fed from the ADF 111 at an interval A. Then, the above period of time or delay T is determined in accordance with a difference C between the intervals B and A, i.e., C=B−A. Further, assume that the apparatus is capable of varying the magnification change ratio between, e.g., 71% and 200%. Then, when the apparatus forms an image on the paper 6 with a magnification change ratio of 200%, the image reading unit 112 scans a document at a linear velocity which is one half of a linear velocity assigned to 100%. In such a case, the delay T is determined in accordance with the above difference C and the magnification change ratio.

As shown in FIG. 6, the document reading unit 112 having read the entire second document 122 starts reading the first document 121 at a scan start position 121*a* assigned to the first document 121 (step S7). In this manner, the document reading unit 112 reads the first document 121 immediately after the second document 122 at the interval A and therefore in a short period of time. In addition, two documents 122 and 121 can be positioned on the glass platen 114 side by side at the distance A, promoting the miniaturization of the image reading unit 112.

The central control unit 101 sends image data being read out of the first document 121 by the document reading unit 112 to the image transfer controller 102 and causes it to start image formation. The image transfer controller 102 delivers the image data representative of the first document 121 to the image forming unit 1. In response, the image forming unit 1 forms a toner image of first color corresponding to the first document 121 on the drum 11 and then transfers it to the belt 21 (primary image transfer) (step S8). After the formation of the image of first color corresponding to the first document 121, the central controller 101 reads the image data representative of the second document 122 and delayed by the period of time T out of the delay memory 103 and feeds them to the image transfer controller 102. The image transfer controller 102 delivers the input image data to the image forming unit 1. In response, the image forming unit 1 forms a toner image of first color corresponding to the second document 122 on the drum 11 and then transfers it to the belt 21 (step S9). These steps are repeated color by color to complete images respectively corresponding to the first and second documents 121 and 122 on the belt 21 (step S10). Because the image data representative of the second document 122 are delayed by the period of time T selected in accordance with the previously stated difference C, the colors are successfully prevented from being deviated from each other and form high quality images on the belt 21.

The images respectively representative of the first and second documents 121 and 122 are transferred from the belt 21 to two papers 6 sequentially fed from the paper feed unit 4 to the secondary image transfer unit 3 (step S14). The images transferred to the papers 6 are free from deviation because they are spaced from each other by the interval B between the papers 6.

When the document size is greater than A4, e.g., when it is A3 (N, step S2), the central controller 101 causes the ADF 111 to convey the document to the glass platen 114 in order to execute the image forming process (steps S11 through S13).

Figure 8:
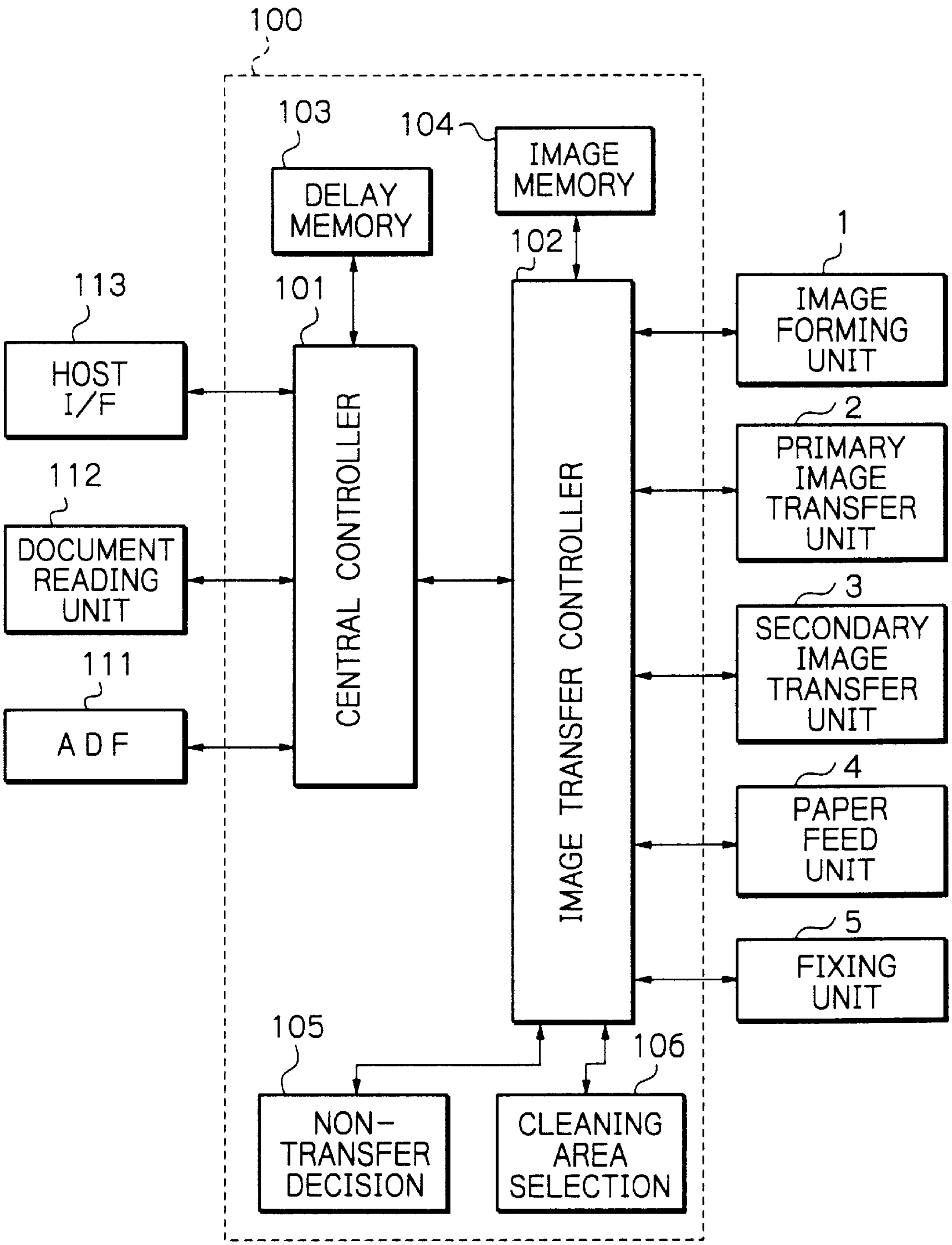
FIG. 8 is a schematic block diagram showing an alternative embodiment of the present invention.

Referring to FIG. 8, an alternative embodiment of the image forming apparatus in accordance with the present invention will be described. In FIG. 8, structural elements identical with the structural elements shown in FIG. 4 are designated by identical reference numerals and will not be described specifically in order to avoid redundancy. This embodiment differs from the previous embodiment in that the control unit 100 writes the image data representative of the second document 122 read first in an image memory 104 and then writes the image data representative of the first document 121 being read in the delay memory 103 so as to delay them by the period of time T.

Figure 9B:
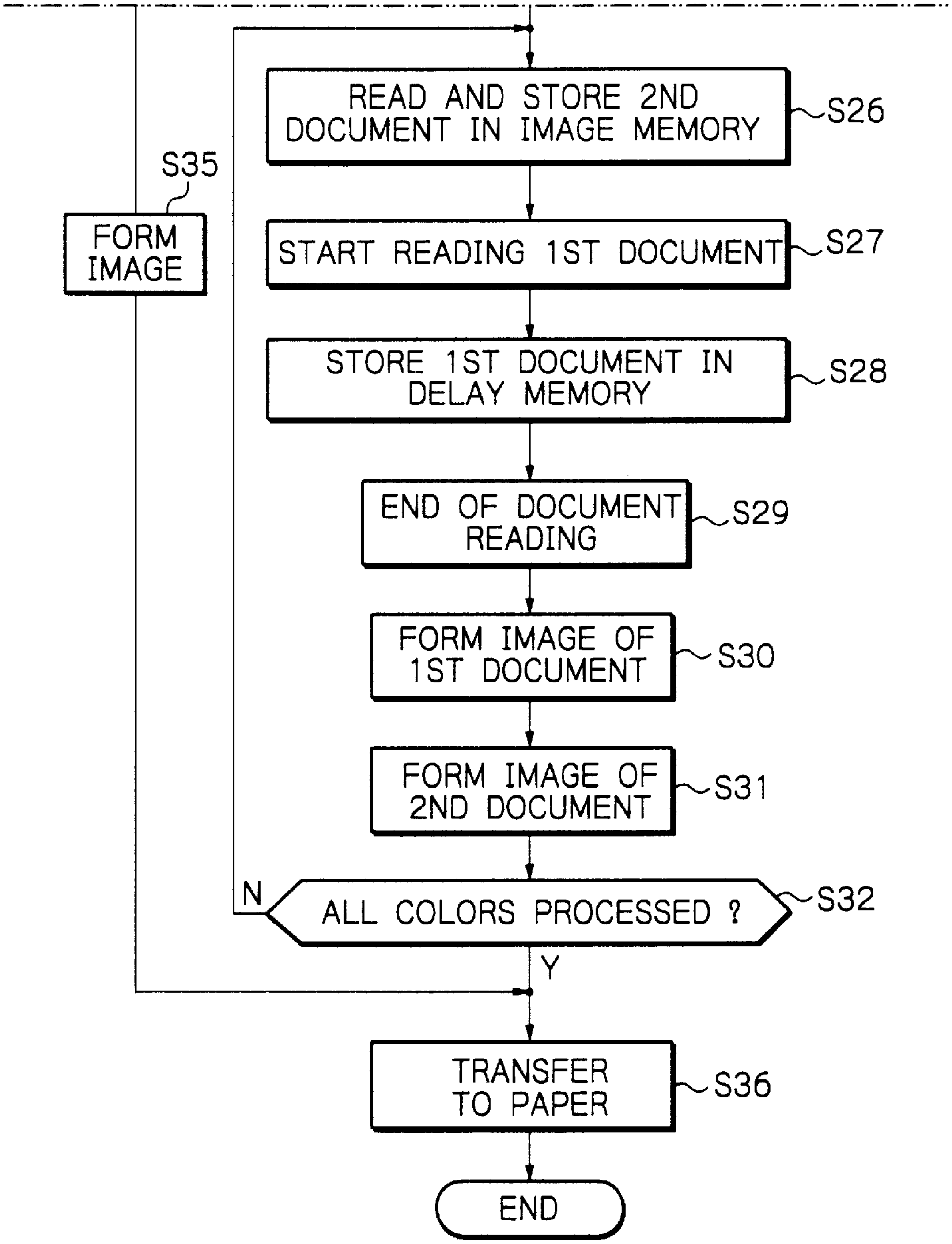
FIG. 9 is a flowchart representative of a specific operation of the embodiment shown in FIG. 8.

A specific operation of the illustrative embodiment will be described with reference to FIG. 9. In FIG. 9, steps S21 through 25 are identical with the steps S1 through S5 of FIG. 5 and will not be described specifically in order to avoid redundancy. After the first and second documents 121 and 122 have been positioned on the glass platen 114 in the condition shown in FIG. 6 (step S25), the central controller 101 causes the document reading unit 112 to read image data out of the second document 122 from the scan start position 122*a* to the scan end position 122*b*. The image data derived from the second document 122 are fed to the image transfer controller 102 and written to the image memory 104 thereby (step S26). Subsequently, the central controller 101 causes the document reading unit 112 to start reading the first document 121 at the scan start position 121*a* (step S27). At this instant, the controller 101 writes the image data of the first document 121 being read in the delay memory 103 by delaying them by the period of time T since the start of reading of the first document 121 (step S28).

After the first document 121 has been fully read, the central controller 101 transfers the image data of the first document 121 from the delay memory 103 to the image memory 104 via the image transfer controller 102 (step S29). The image transfer controller 102 first reads the image data of the first document 121 out of the image memory 104 and sends them to the image forming unit 1. The image forming unit 1 forms a toner image of first color corresponding to the first document 121 (step S30). Subsequently, the image transfer controller 102 reads the image data of the second document 122 out of the image memory 104 in accordance with the delay T and the distance A between the documents and sends them to the image forming unit 1. In response, the image forming unit 1 forms of a toner image of second color corresponding to the second document 122 (step S31). This procedure is repeated color by color with the result that images respectively corresponding to the first and second colors are completed on the belt 21 (step S32).

As stated above, when images respectively corresponding to the first and second documents 121 and 122 are to be formed on the belt 21, the image data of the first document 121 read after the second document 122 are written to the image memory 104 while being delayed by the period of time T since the start of reading. The colors are therefore successfully prevented from being deviated from each other and form high quality images on the belt 21. The images formed on the belt 21 each are transferred to a particular paper 6 fed from the paper feed unit 4 to the secondary image transfer unit 3 at the interval B (step S36). The images transferred to the papers 6 are free from deviation because they are spaced from each other by the interval B between the papers 6.

When the document size is greater than A4, e.g., when it is A3 (N, step S22), the central controller 101 causes the ADF 111 to convey the document to the glass platen 114 in order to execute the image forming process (steps S33 through S35). Finally, an image formed on the belt 21 is transferred from the belt 21 to a paper 6 fed from the paper feed unit 4 to the secondary image transfer unit 3 (step S36).

The above embodiments each delay the image data of the second document 122 relative to the image data of the first document 121 by the period of time T. If desired, the period of time T may be corrected in accordance with a registration adjustment value assigned to the paper feed unit 4, a registration adjustment value assigned to the ADF 111 and/or the reading speed of the document reading unit 112. This is successful to correct scattering in accuracy between image forming apparatuses and therefore to further enhance image quality.

In summary, it will be seen that the present invention provides an image forming apparatus having various unprecedented advantages, as enumerated below.

(1) The apparatus continuously conveys a first and a second document set on an ADF and having a reference image size to a document reading unit. When the document reading unit reads the first and second documents, image data read out of the second document are written to a delay memory. After the first document has been read, the image data of the second document are read out of the delay memory on the elapse of a period of time corresponding to a difference between an interval between consecutive papers and an interval between the above documents fed by the ADF. The apparatus can therefore efficiently form the images of two documents at the same time without resorting to a large capacity memory.

(2) The apparatus continuously conveys two documents set on an ADF and having a reference image size to a document reading unit at a preselected interval. When the document reading unit having read first one of the two documents starts reading the next document, the image data of the next document are delayed by the difference between the two intervals. The image data of the two documents can therefore be stored at the interval between the consecutive papers, so that high quality images free from defective registration are achievable.

(3) Because the image data of the second document are delayed by the period of time corresponding to the above difference, desirable images free from defective registration are achievable.

(4) The first document is read shortly after the reading of the second document at the interval between the papers, so that the document reading unit can read two documents in a short period of time. Also, because two documents are positioned on a glass platen at the interval between papers, the document reading unit and therefore the entire apparatus can be reduced in size.

(5) By determining the above period of time in accordance with the above difference and a magnification change ratio, it is possible to form high quality images free from defective registration without regard to the magnification change ratio.

(6) Further, by correcting the above period of time in accordance with the registration adjustment value of papers, the registration adjustment value of the ADF and/or the reading speed of the document reading unit, it is possible to correct scattering in accuracy between image forming apparatuses and therefore to further enhance image quality.

Various modifications will become possible for those skilled in the art after receiving the teachings of the present disclosure without departing from the scope thereof.

What is claimed is:

1. An image forming apparatus comprising:

a photoconductive element for forming a toner image thereon;

an intermediate image transfer body provided with a plurality of reference marks defining reference positions for a transfer of the toner image, and capable of simultaneously holding two different toner images of a reference image size transferred from said photoconductive element, said image forming apparatus transferring said two toner images from said intermediate image transfer body to two papers fed one by one;

a document reading unit for sequentially reading two documents of the reference image size sequentially fed from an ADF (Automatic Document Feeder); and control means for storing, when said document reading unit reads the two documents, image data representative of a second document in a delay memory and outputting, after a first document has been read, said image data representative of said second document by delaying said image data by a period of time corresponding to a difference between an interval between the papers and an interval between the documents.

2. An apparatus as claimed in claim 1, wherein said period of time is determined in accordance with the interval between the papers, the interval between the documents, and a magnification change ratio.

3. An apparatus as claimed in claim 1, wherein said period of time is corrected in accordance with a registration adjustment time assigned to the papers.

4. An apparatus as claimed in claim 1, wherein said period of time is corrected in accordance with a registration adjustment time assigned to the ADF.

5. An apparatus as claimed in claim 1, wherein said period of time is corrected in accordance with a reading speed of said document reading unit.

6. An image forming apparatus comprising:

a photoconductive element for forming a toner image thereon;

an intermediate image transfer body provided with a plurality of reference marks defining reference positions for a transfer of the toner image, and capable of simultaneously holding two different toner images of a reference image size transferred from said photoconductive element, said image forming apparatus transferring said two different toner images from said intermediate image transfer body to papers fed one by one;

a document reading unit for sequentially reading two documents of the reference image size sequentially fed from an ADF (Automatic Document Feeder) at a preselected interval; and control means for storing, when said document reading unit having read a first one of the two documents starts reading a next, image data representative of said next document by delaying said image data by a period of time corresponding to a difference between an interval between papers fed one by one and an interval between the documents fed from the ADF.

7. An apparatus as claimed in claim 6, wherein said period of time is determined in accordance with the interval between the papers, the interval between the documents, and a magnification change ratio.

8. An apparatus as claimed in claim 6, wherein said period of time is corrected in accordance with a registration adjustment time assigned to the papers.

9. An apparatus as claimed in claim 6, wherein said period of time is corrected in accordance with a registration adjustment time assigned to the ADF.

10. An apparatus as claimed in claim 6, wherein said period of time is corrected in accordance with a reading speed of said document reading unit.

* * * * *